(12) United States Patent
Lamoree et al.

(10) Patent No.: US 8,292,223 B2
(45) Date of Patent: Oct. 23, 2012

(54) SECURING EMERGENCY AND SAFETY EQUIPMENT ON AIRCRAFT

(75) Inventors: Bret L. Lamoree, Snohomish, WA (US); Mark E. Wentland, Lynnwood, WA (US); James P. Schalla, Edmonds, WA (US); Phillip J. Bobzien, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1045 days.

(21) Appl. No.: 12/059,891

(22) Filed: Mar. 31, 2008

(65) Prior Publication Data

US 2009/0242695 A1    Oct. 1, 2009

(51) Int. Cl.
*B64D 13/00* (2006.01)
*B64D 11/06* (2006.01)
(52) U.S. Cl. .................. 244/118.6; 244/122 R; 383/202; 83/856; 53/381.2; 414/412
(58) Field of Classification Search ............... 244/118.6, 244/122 R, 149; 441/88, 106; 206/571; 225/6, 91; 83/856, 956; 53/381.2; 414/412; 297/188.08, 188.11
See application file for complete search history.

(56) References Cited

U.S. PATENT DOCUMENTS

| | | | |
|---|---|---|---|
| 1,387,798 A | | 8/1921 | Miller |
| 2,419,884 A | | 4/1947 | Caughey |
| 2,982,075 A | * | 5/1961 | Foster .......................... 53/381.2 |
| 3,623,683 A | * | 11/1971 | Bennett ...................... 244/122 A |
| 3,923,198 A | | 12/1975 | Brochman |
| 5,082,702 A | | 1/1992 | Alband |
| 5,745,030 A | | 4/1998 | Aaron |
| 5,810,392 A | | 9/1998 | Gagnon |
| 5,945,914 A | | 8/1999 | Holmes et al. |
| 5,990,799 A | | 11/1999 | Boon et al. |
| 6,054,922 A | | 4/2000 | Smith |
| 6,082,816 A | | 7/2000 | Gottlieb et al. |
| 6,902,453 B2 | | 6/2005 | Switlik et al. |
| 6,929,218 B1 | | 8/2005 | Sanford et al. |
| 6,960,110 B2 | * | 11/2005 | Hough ............................ 441/80 |
| 7,077,466 B2 | * | 7/2006 | Förstner et al. .......... 297/188.08 |
| 7,133,913 B2 | | 11/2006 | Thwaites et al. |
| 7,178,867 B2 | * | 2/2007 | Hough ..................... 297/188.08 |
| 7,252,569 B2 | * | 8/2007 | Everhart et al. ................. 441/80 |
| 7,530,631 B2 | * | 5/2009 | Skelly et al. ............ 297/188.08 |
| 8,094,041 B2 | | 1/2012 | Wentland et al. |
| 2003/0215162 A1 | * | 11/2003 | Switlik et al. .................... 383/59 |
| 2004/0239435 A1 | | 12/2004 | Hughes et al. |
| 2005/0062319 A1 | * | 3/2005 | Hough ..................... 297/188.08 |
| 2006/0138813 A1 | * | 6/2006 | Hough ..................... 297/188.08 |
| 2007/0015422 A1 | * | 1/2007 | Everhart et al. ................. 441/80 |
| 2007/0232164 A1 | | 10/2007 | Swan et al. |
| 2008/0101612 A1 | | 5/2008 | Hough et al. |

OTHER PUBLICATIONS

U.S. Appl. No. 12/059,209, filed Mar. 31, 2008, Wentland et al.
Amendment pursuant to request for continued examination dated Jul. 6, 2011 regarding U.S. Appl. No. 12/059,209, 20 pages.

(Continued)

*Primary Examiner* — Philip J Bonzell
(74) *Attorney, Agent, or Firm* — Yee & Associates, P.C.

(57) ABSTRACT

An emergency equipment system comprising an elongate member, an emergency equipment package, and a cutter. The elongate member may have a first end and an angled end. The emergency equipment package may have a sleeve on one side capable of receiving the elongate member from the angled end. The cutter may be attached to a side of the elongate member and may be capable of cutting the sleeve.

10 Claims, 10 Drawing Sheets

OTHER PUBLICATIONS

USPTO final office action dated Apr. 29, 2011 regarding U.S. Appl. No. 12/059,209, 15 pages.
USPTO non-final office action dated Nov. 16, 2010 regarding U.S. Appl. No. 12/059,209, 11 pages.
USPTO notice of allowance dated Oct. 21, 2011 regarding U.S. Appl. No. 12/059,209, 13 pages.
Response to office action dated Feb. 14, 2011 regarding U.S. Appl. No. 12/059,209, 20 pages.

* cited by examiner

SECURING EMERGENCY AND SAFETY EQUIPMENT ON AIRCRAFT

BACKGROUND INFORMATION

1. Field

The present disclosure relates generally to aircraft and in particular to emergency and safety equipment for aircraft. Still more particularly, the present disclosure relates to securing emergency and safety equipment on aircraft.

2. Background

Airline procedures may be important to ensure the safety for passengers using air travel. Currently, inspections of the interior of an aircraft may be made to ensure that the required minimum equipment may be present before flight, for example, that life vests may be present in all passenger seats. Any missing equipment may be required to be replaced before flight.

Also, interior inspections may be made to prevent placement or identify prohibited objects and/or items in an aircraft in place of or with emergency equipment. The current inspections may be performed to ensure the finding of and/or disposing of these types of objects. Aircraft regularly undergo vigorous inspections each day, for example, while cleaning the aircraft between flights resulting in several man-hours per airplane per day. In addition, some emergency equipment, such as, for example without limitation, life vests are taken by passengers causing replacement costs to aircraft operators.

These and other types of inspections may be time consuming and may increase the amount of time needed between flights. These types of inspections may reduce the number of flights possible, as well as requiring increased personnel to perform inspections.

Attempts have been made to make inspections easier to perform. For example, life vests may be placed into boxes or compartments with doors. These doors may then be sealed with a tamper evident device. A tamper evident device may be a device that provides a visual indication when a sealed door becomes disturbed, moved, and/or tampered. As a result, a visual inspection may be quickly made to determine whether the tamper evident device is intact.

With respect to inspecting life vest pouches, an inspector may pull out the life vest, pat down the life vest, and perform a visual inspection of the inside of the pouch. This inspection may be performed for every seat every morning before the first flight of the day. Cleaning crews also may perform a cursory inspection of the vest and pouch to determine if the vest may still be in place.

Visually inspecting the spaces, including seat cushions, is labor intensive. This type of inspection increases expense and time to operate flights. Most spaces in an aircraft may not be accessed or tampered with the majority of the time.

Therefore, it would be advantageous to have an improved method and apparatus to overcome the problems described above.

SUMMARY

An advantageous embodiment of the present disclosure provides an emergency equipment system comprising an elongate member, an emergency equipment package, and a cutter. The elongate member may have a first end and an angled end. The emergency equipment package may have a sleeve on one side capable of receiving the elongate member from the angled end. The cutter may be attached to a side of the elongate member and may be capable of cutting the sleeve.

In another advantageous embodiment, an emergency equipment system comprises a housing, a moveable door, an interior wall, and a locking mechanism. The housing may have an opening, and the moveable door may be attached to the opening. The interior wall is capable of being moved into a location towards the opening when a piece of emergency equipment located within the housing is moved in a first direction. The locking mechanism may be capable of locking the interior wall in the location.

In yet another advantageous embodiment, an aircraft emergency equipment system is present for securing an emergency equipment package to a bottom side of an aircraft seat. The aircraft emergency equipment system comprising an elongate member, an emergency equipment package, a cutter, and a conductive sensor. The elongate member has a first end and an angled end. The emergency equipment package has a sleeve on one side capable of receiving the elongate member from the angled end. The cutter is attached to a side of the elongate member and is capable of cutting the sleeve. The conductive sensor is attached to one end of the ripper bar, wherein the conductive sensor is in an open state while the sleeve is secured to the ripper bar preventing the conductive sensor from contacting the elongate member and wherein the conductive sensor is in a closed state and when the emergency equipment package is moved towards the second end a selected distance and the conductive sensor contacts the elongate member, the sensor generates an indication. The emergency equipment package is capable of being secured to the elongate member by the sleeve and wherein moving the emergency equipment package secured on the elongate member a selected distance towards the angled end causes the cutter to cut the sleeve.

In still another advantageous embodiment, a method is provided to monitor aircraft emergency equipment in an aircraft. An emergency equipment package is placed onto an elongate member having a first end and an angled end, wherein the elongate member is located on a bottom side of an aircraft seat and wherein the emergency equipment package has a sleeve on one side capable of receiving the elongate member from the angled end in which a cutter is attached to a side of the elongate member and is capable of cutting the sleeve. A conductive sensor attached to around one end of the ripper bar is monitored, wherein the conductive sensor is in an open state while the sleeve is secured to the ripper bar preventing the conductive sensor from contacting the elongate member and wherein the conductive sensor is in a closed state when the emergency equipment package is moved towards the second end a selected distance and the conductive sensor contacts the elongate member wherein the sensor generates an indication. In response to detecting the indication, an alert is generated.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
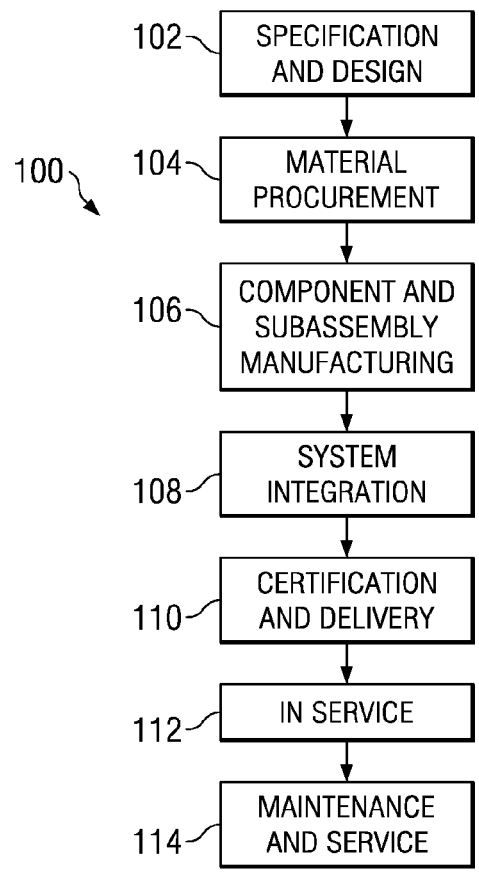
FIG. 1 is a diagram illustrating an aircraft manufacturing and service method in accordance with an advantageous embodiment.
Figure 2:
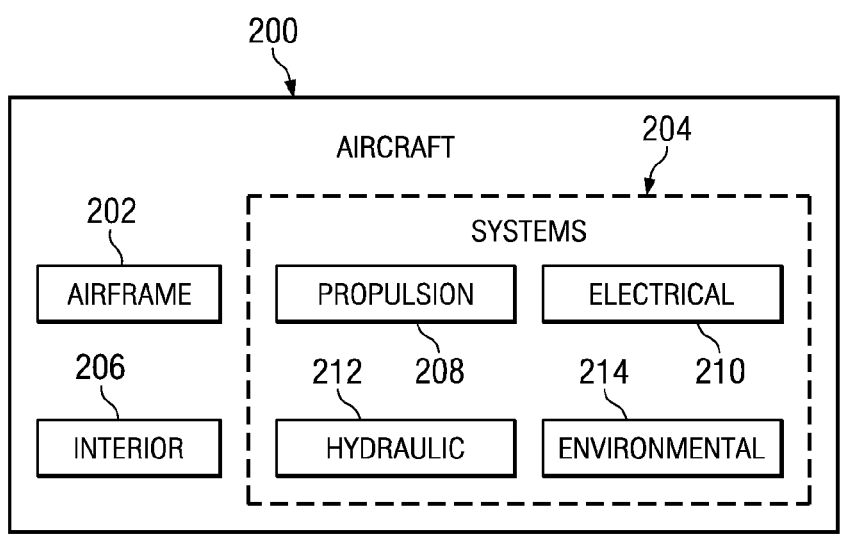
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include inspections, modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

More specifically, the advantageous embodiments may be implemented to secure emergency equipment to aircraft seats during component and subassembly manufacturing 106 and/or system integration 108. The different advantageous embodiments may be implemented in an aircraft seat as they are built and/or installed into an aircraft. Further, the different advantageous embodiments also may be implemented during maintenance and service 114. Existing aircraft seats may be modified and/or replaced during this phase to include the different advantageous embodiments.

With reference now to FIG. 2, a diagram of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. The different advantageous embodiments may be found in interior 206 of aircraft 200 in these examples. Any number of other systems may be included. Although an aerospace example is shown, different advantageous embodiments may be applied to other industries, such as the marine industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the initial and/or operating cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that some emergency equipment may be required to be readily accessible by passengers in an emergency situation. The different advantageous embodiments recognize that much of this equipment may be unprotected from actions, such as theft, tampering, and/or potential use for non-constructive purposes. As a result, inspections may be required at different times during the same day to ensure that the emergency equipment has not been removed or tampered with.

The different advantageous embodiments also recognize that existing systems for securing emergency equipment were designed when different passenger environments existed. Many of the systems were not designed to prevent and/or detect tampering and/or theft. These systems also were not designed for repetitive inspection ergonomics.

The different advantageous embodiments recognize that it may be advantageous to eliminate or significantly reduce inspection requirements whenever possible. Further, the different advantageous embodiments recognize that it may be desirable to secure emergency and safety equipment in the manner to reduce inspections to limited locations, as opposed to inspecting all locations in which emergency and safety equipment may be located on an aircraft. As used herein, the term emergency equipment refers to emergency and/or safety equipment.

The different advantageous embodiments recognize that currently used mechanisms involve, for example, tamper evident devices, wires, and/or cable ties to secure emergency equipment, such as, for example, without limitation, life vests in a pouch under an aircraft seat. As used herein, both emergency and safety equipment may be referred to as emergency equipment. The different advantageous embodiments recognize that the use of cable ties and/or wires may make it difficult to reach emergency equipment if this equipment becomes needed. The different advantageous embodiments also recognize the current used method of tamper evident devices placed over openings may not work well with pouches or flexible materials.

Current mechanisms also may use rigid boxes with rigid doors that may be sealed with tamper evident tape. This current process may reduce inspections, but still requires a non-ergonomic visual inspection to ensure that the tamper evident tape may still be in place. Further, the use of tamper evident tape or other devices may be aesthetically undesirable. Also, in some cases, the tamper evident tape may have been accidentally compromised even though the box may not have been opened. Thus, the different advantageous embodiments provide emergency equipment systems for use in a passenger cabin.

Figure 3:
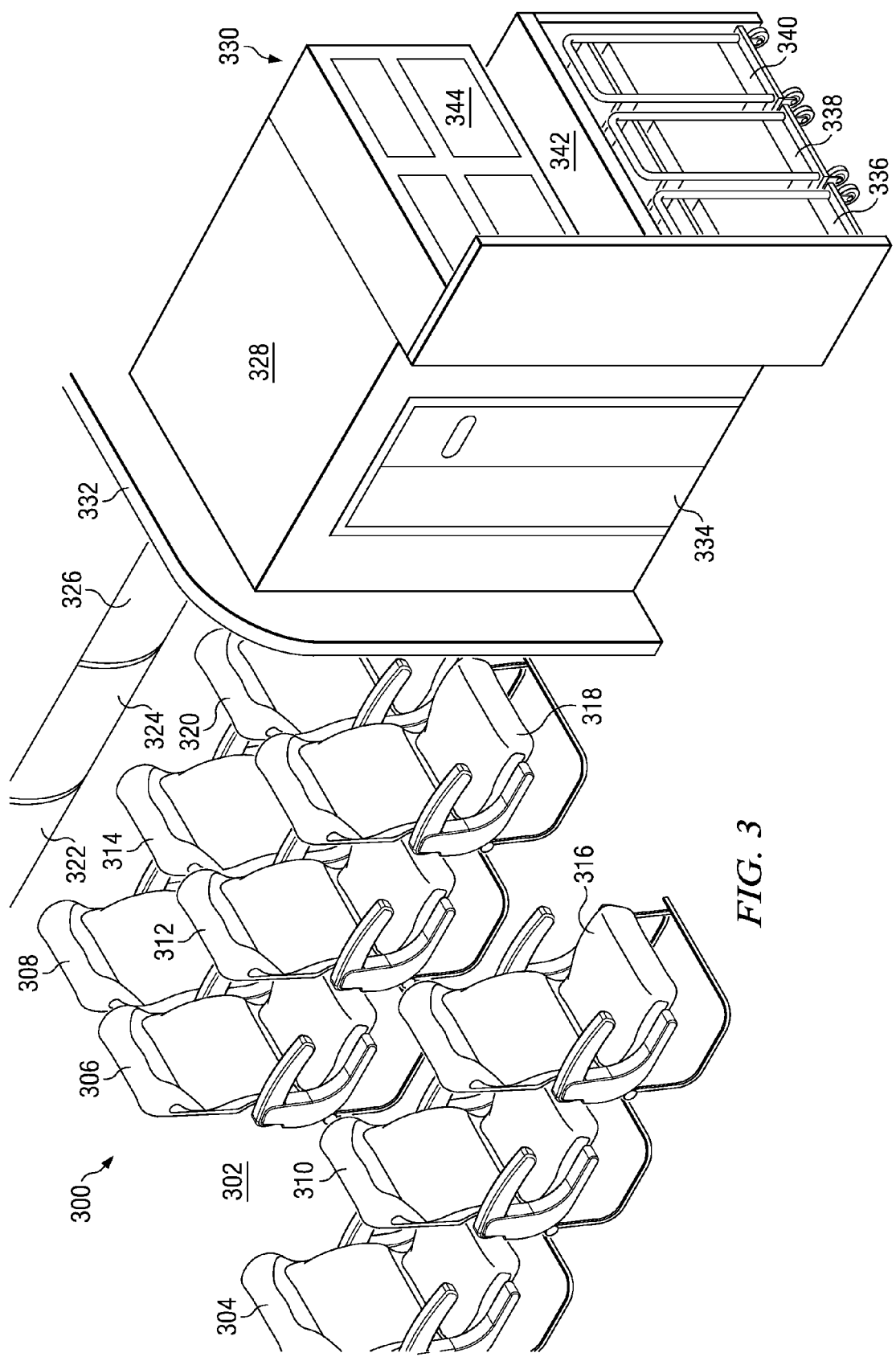
FIG. 3 is an illustration of a portion of a passenger cabin in accordance with an advantageous embodiment.

With reference now to FIG. 3, an illustration of a portion of a passenger cabin is depicted in accordance with an advantageous embodiment. In this example, passenger cabin 300 is an example of a seating area that may be present in interior 206 of aircraft 200. Passenger cabin 300 may include passenger seating in seating area 302. Passenger seating may include aircraft seats 304, 306, 308, 310, 312, 314, 316, 318, and 320.

Further, seating area 302 in passenger cabin 300 may also include storage areas, such as overhead compartments 322, 324, and 326. Passenger cabin 300 also may include lavatory 328 and galley area 330. These two areas may be partitioned or separated from seating area 302 by a partitioning structure such as, for example, without limitation, wall 332. Lavatory 328 may have door 334, which allows entry into lavatory 328. Further, galley area 330 may include carts 336, 338, and 340, which may be stored under counter 342. Further, galley area 330 also may include cabinets 344. Cabinets 344 may store various items, such as, for example, without limitation, drinks, tableware, plates, cups, napkins, coffee, and other suitable items for galley area 330.

This illustration of passenger cabin 300 for an aircraft is provided for purposes of illustrating one environment in which the different advantageous embodiments may be implemented. The illustration of passenger cabin 300 in FIG. 3 is not meant to imply architectural limitations as to the manner in which different advantageous embodiments may be implemented.

For example, other areas may be present in addition to passenger seating area 302, lavatory 328, and galley area 330. Other areas may include, for example, without limitation, closets, storage areas, lounges, and other suitable areas for passenger seating. As another example, aircraft seats within seating area 302 may be arranged differently from the depicted example.

In other advantageous embodiments, seats may be grouped into sets of three, four, five, or any number of aircraft seats instead of two or single seats as illustrated in seating area 302. The different advantageous embodiments provide emergency equipment systems that may be integrated into aircraft seats, such as those illustrate in FIG. 3.

Figure 4:
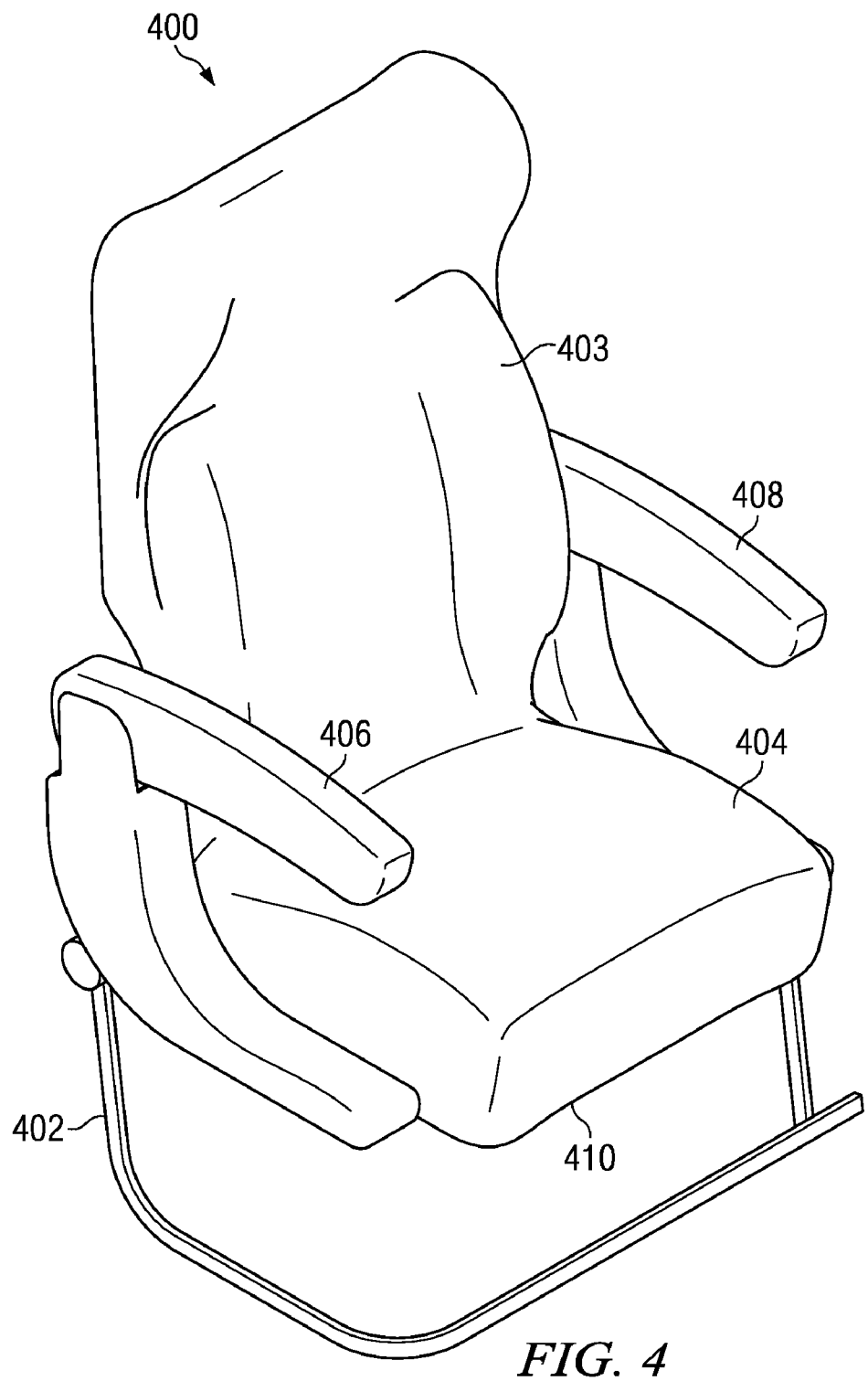
FIG. 4 is an illustration of an aircraft seat in accordance with an advantageous embodiment.

With reference now to FIG. 4, an illustration of an aircraft seat is depicted in accordance with an advantageous embodiment. Aircraft seat 400 is an example of an aircraft seat from seating area 302 in FIG. 3 in which an emergency equipment system may be implemented. This emergency system may be implemented as part of aircraft seat 400, such as when manufacturing aircraft seat 400. In other advantageous embodiments, the emergency equipment system may be added to aircraft seat 400 at a later time, such as during maintenance operations.

In this illustrative example, aircraft seat 400 may include frame 402, some of which is not shown, which may provide the structure for aircraft seat 400. Further, aircraft seat 400 also may include seat back 403, seat cushion 404, arm rest 406, and arm rest 408. In the different advantageous embodiments, emergency equipment may be secured using an emergency equipment system located under seat cushion 404 around bottom side 410 of seat cushion 404. This illustration of aircraft seat 400 is provided as an example of one type of aircraft seat in which an emergency equipment system may be implemented. This illustration is not meant to imply limitation as to the type aircraft seat in which different advantageous embodiments may be implemented.

Figure 5:
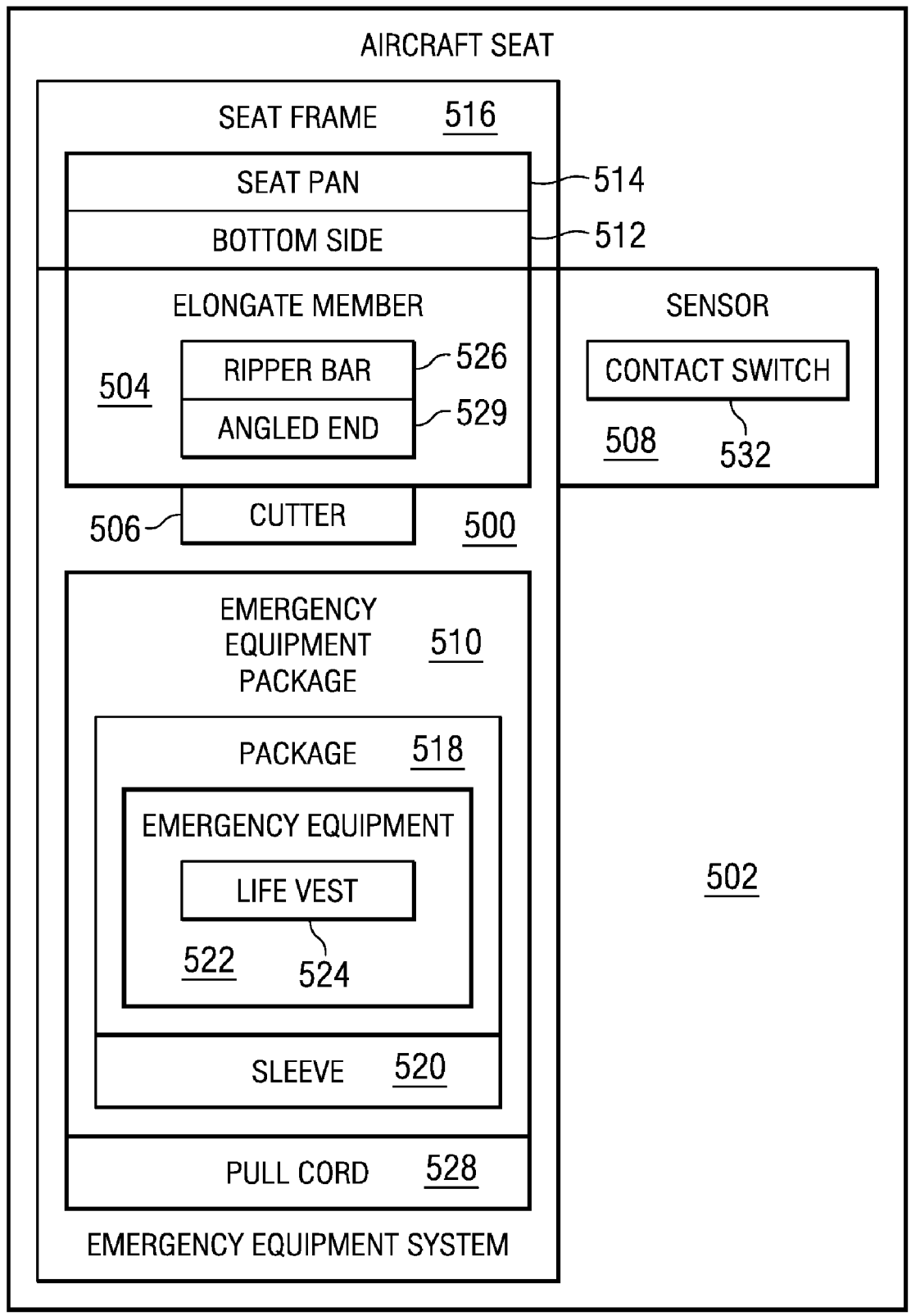
FIG. 5 is an illustration of a block diagram of an aircraft seat with an emergency equipment system in accordance with an advantageous embodiment.

With reference now to FIG. 5, an illustration of a block diagram of an aircraft seat with an emergency equipment system is depicted in accordance with an advantageous embodiment. In this example, emergency equipment system 500 may be installed in aircraft seat 502. Aircraft seat 502 may be an aircraft seat, such as, for example, aircraft seat 400 in FIG. 4.

Emergency equipment system 500 may include elongate member 504, cutter 506, sensor 508, and emergency equipment package 510. In these examples, elongate member 504 may be attached to aircraft seat 502 on bottom side 512 of seat pan 514. In these advantageous embodiments, elongate member 504 may alternatively be attached to seat frame 516. Elongate member 504 may provide a structure for holding and/or securing emergency equipment package 510.

As depicted, emergency equipment package 510 may include package 518, sleeve 520, and emergency equipment 522. In these examples, emergency equipment 522 may take the form of life vest 524. Emergency equipment 522 may take other forms. For example, without limitation, emergency equipment 522 also may be, for example, a location device, a raft, a smokehood, a fire extinguisher, a portable oxygen unit, a defibrillator, a signaling device, a radio flashlight, a megaphone, or some other suitable emergency equipment.

Package 518 may encompass or contain emergency equipment 522. Package 518 may be, for example, a sealable plastic bag, or some other packaging system. In these advantageous embodiments, package 518 may be an air evacuated package. In this manner, attempts at tampering and/or theft may be easily identified based on whether package 518 may be intact. In these examples, sleeve 520 may be manufactured as part of package 518.

In other advantageous embodiments, sleeve 520 may be attached or otherwise secured to package 518. A simple shop rework method may exist for qualified personnel to easily replace sleeve 520 on the undamaged life vest packaging for future use and/or a simple method may exist for qualified personnel to place any undamaged, partially or completely removed life vest in a new life vest packaging with an integral sleeve 520 for future use. Sleeve 520 may be used to secure emergency equipment package 510 to elongate member 504.

Elongate member 504 may be any rigid and/or semi-rigid structure that may receive sleeve 520 to secure emergency equipment package 510 on bottom side 512 of seat pan 514 in these examples. In particular, elongate member 504 may be ripper bar 526. Elongate member 504 may be constructed from various materials. These materials include, for example, without limitation, aluminum, steel, titanium, plastic, composite material, or any other suitable material. Such an elongated member 504 may not require a separate pouch to accommodate package 518. In addition, with this embodiment, objects may not be placed and/or stored on the top side of the elongated member 504.

Additionally, pull cord 528 may be attached to emergency equipment package 510 to aid in removing emergency equipment package 510 from bottom side 512 of seat pan 514 when access to emergency equipment package 510 may be needed.

After emergency equipment package 510 has been secured to elongate member 504, attempts to pull or remove emergency equipment package 510 may result in sleeve 520 being cut by cutter 506. In this manner, emergency equipment package 510 may not be re-secured on bottom side 512 of seat pan 514 after emergency equipment package 510 has been removed. Cutting of this sleeve 520 may place the emergency equipment package 510 in a state that this package may not be compromised to any level and then re-installed or disguised as being in a normal installation and/or condition. Inspections may become greatly simplified, as the inspector may only need to verify that the equipment is still properly installed. With the cut sleeve, it becomes obvious to inspectors by the absence of the equipment and/or an improper installation.

In other advantageous embodiments, sleeve 520 may be cut by cutter 506 if emergency equipment package 510 has been moved some selected distance on elongate member 504 even though emergency equipment package 510 has not been removed from elongate member 504. This situation results in an unusual attitude or positioning of the emergency equipment. This attitude or positioning may provide a clear visual to the inspectors of a presence of a compromised unit.

In these examples, cutter 506 may be located within angled end 529 of ripper bar 526. Angled end 529 may allow sleeve 520 to be slid onto elongate member 504, bypassing the cutter 506. Angled end 529, however, may prevent sleeve 520 from being slid or moved off ripper bar 526 without being cut by cutter 506.

Further, in these advantageous embodiments, movement and/or removal of emergency equipment package 510 on ripper bar 526 may be detected by sensor 508. In these examples, sensor 508 may take the form of contact switch 532. In this particular illustrative example, ripper bar 526 may be a conductive component. Ripper bar 526 may be made from a conductive material to provide the conductivity. In other advantageous embodiments, ripper bar 526 may be constructed from a nonconductive material and include a conductive coating or surface. With this implementation, sleeve 520 may be a non-conductive sleeve. Sleeve 520 may be positioned between contact switch 532 and elongate member 504.

In this manner, removal and/or a selected movement of emergency equipment package 510 may cause sleeve 520 to move such that contact switch 532 contacts elongate member 504, generating a signal. This signal may be used to indicate that emergency equipment package 510 may have been removed and or tampered with. This signal then permits inspections that initially only require observation of such signaling results at a central, remote, or local enunciator. Only if a signal had been generated, then a more thorough, yet focused, inspection ensues.

Figure 6:
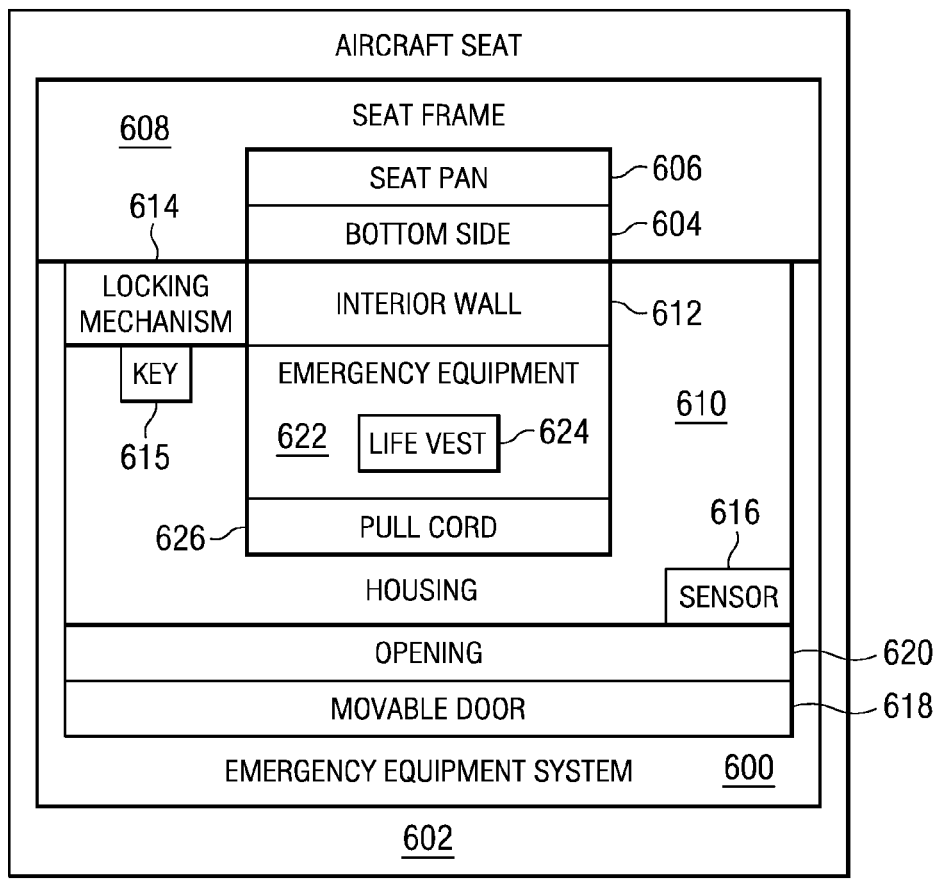
FIG. 6 is an illustration of another emergency equipment system in accordance with an advantageous embodiment.

Turning now to FIG. 6, an illustration of another emergency equipment system is depicted in accordance with an advantageous embodiment. In this example, emergency equipment system 600 may be installed in aircraft seat 602. In particular, emergency equipment system 600 may be located on bottom side 604 of seat pan 606. In these examples, emergency equipment system 600 may be secured to seat frame 608.

Emergency equipment 600 may include housing 610, interior wall 612, locking mechanism 614, sensor 616, and moveable door 618. In these examples, housing 610 may be a rigid housing with opening 620. Housing 610 may take various forms. For example, without limitation, housing 610 may be a rectangular, a square, a cylinder, oval, semi-circular, a prismatic section, or any other suitable shape. Housing 610 may be made from various materials. For example, without limitation, the materials may be a honeycombed medium, and/or fiber reinforced resin composite, such as carbon fibers in a resin matter, aromatic nylon, para-aramid fibers, polycarbonate resin, Polyetheretherketone, and other suitable materials.

Moveable door 618 may open and/or close to expose and cover opening 620. Emergency equipment 622 may be placed into housing 610 through opening 620.

In these advantageous embodiments, interior wall 612 may move towards opening 620 as emergency equipment 622 moves towards opening 620. Interior wall 612 may be moved into a location blocking opening 620. This location may form a barrier to close opening 620 or may, in some examples, prevent access to the interior of housing 610.

Additionally, locking mechanism 614 may prevent interior wall 612 from being moved back away from opening 620 to allow replacement of emergency equipment 622 without key 615. In this manner, emergency equipment 622 may not be removed, tampered with, and then replaced into housing 610. Also, other objects may not be placed into housing 610. Inspections may become greatly simplified because the inspector would then only need to verify that the housing is in a normal state.

Locking mechanism 614 may take many different forms. For example, without limitation, locking mechanism 614 may be a rail with one-way jam levers, ratchet stops, slip nuts, drop pins, and/or bars or some other suitable device allowing only one directional movement without hindrance. With some mechanisms, interior wall 612 may not be moved in a backward motion. In other advantageous embodiments, interior wall 612 may be moved some distance back and forth with locking mechanism 614 locking interior wall 612 in place after movement of interior wall 612 some distance towards opening 620.

For example, without limitations, if locking mechanism 614 takes the form of a magnetic latch, which may latch interior wall 612 in a manner that interior wall 612 may only move forward towards opening 620, key 615 may take the form of a magnet. In another non-limiting example, if locking mechanism 614 takes the form a one-way slip nut, key 615 may be a drill.

Emergency equipment 622 may take the form of life vest 624 in these examples. Emergency equipment 622 also may take other forms. For example, without limitation, emergency equipment 622 also may be a flotation device, a flashlight, or some other suitable emergency device or item.

In these examples, pull cord 626 may be used to aid in the removal of emergency equipment 622 from housing 610. Pull cord 626 may be directly attached to emergency equipment 622 and/or interior wall 612. In some embodiments, pull cord 626 may be attached to emergency equipment 622 with emergency equipment 622 being attached to interior wall 612. In this manner, as emergency equipment 622 moves towards and/or through opening 620, interior wall 612 may move in the same direction. In other advantageous embodiments, pull cord 626 may be attached to interior wall 612. Pulling of pull cord 626 through opening 620, may cause interior wall 612 to move forward, pushing emergency equipment 622 in the same direction.

Further, in the different advantageous embodiments, sensor 616 may be used to detect when moveable door 618 has been opened. In this manner, emergency equipment system 600 may generate an indicator that tampering may have occurred with emergency equipment 622.

The different examples illustrated in FIGS. 5 and 6 are not meant to imply architectural limitations as to the manner in which different advantageous embodiments may be implemented. The different emergency equipment systems may include other components and/or functions in addition to and/or in place of the ones described. For example, in some advantageous embodiments, the emergency equipment system also may include the emergency equipment.

As another example, in other advantageous embodiments, emergency equipment 622 in FIG. 6 may include multiple pieces of equipment. Further, although these different advantageous embodiments are illustrated as being secured to a bottom side of a seat pan, the emergency equipment system in the advantageous embodiments may be used in other locations. For example, without limitation, emergency equipment systems may be placed under cabinets, within closets, in overhead cavities and/or other suitable locations.

Figure 7:
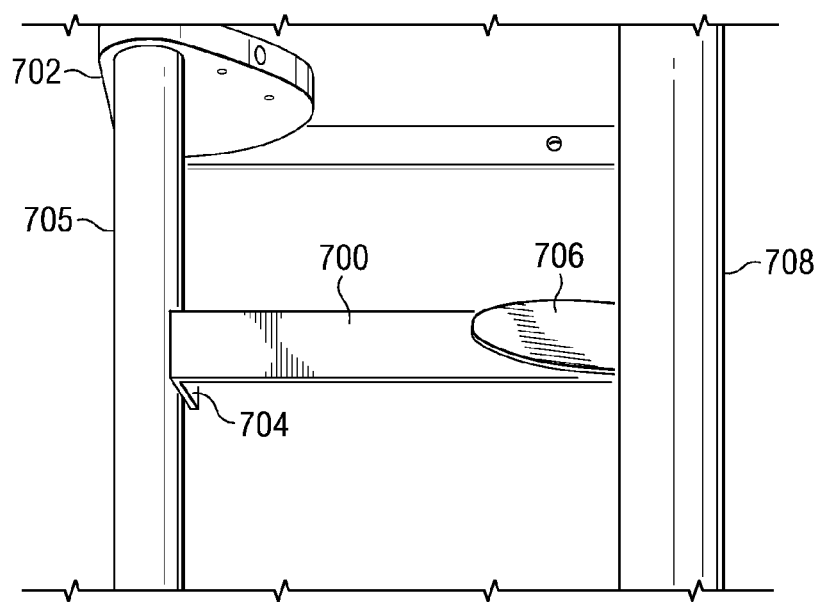
FIG. 7 is an illustration of a top view of an emergency equipment system in accordance with an advantageous embodiment.

With reference now to FIG. 7, an illustration of a top view of an emergency equipment system is depicted in accordance with an advantageous embodiment. In this example, a top view of a portion of an aircraft seat containing an emergency equipment system is depicted in accordance with an advantageous embodiment. FIG. 7 is an illustration of one possible implementation for emergency equipment system 500 in FIG. 5.

In this illustration, ripper bar 700 may be connected to seat frame 702. In this example, ripper bar 700 may be positioned such that ripper bar 700 may be positioned parallel to a surface of the floor. In other advantageous embodiments, ripper bar 700 may be positioned at an angle to the floor. In particular, end 704 may be connected to bar 705 of seat frame 702. Angled end 706 may face front 708 of seat frame 702.

Figure 8:
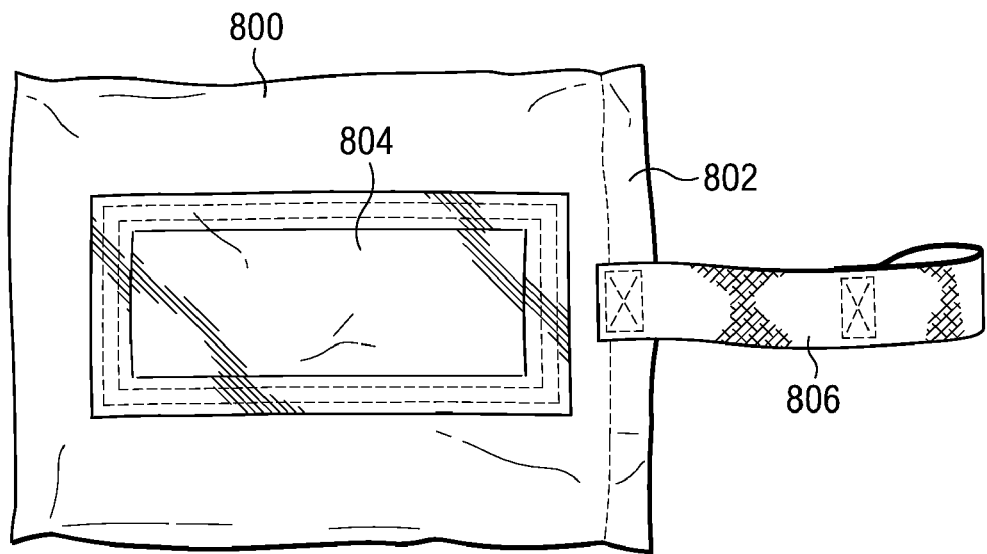
FIG. 8 is an illustration an emergency equipment package for use in an emergency equipment system in accordance with an advantageous embodiment.

With reference now to FIG. 8, an illustration an emergency equipment package for use in an emergency equipment system is depicted in accordance with an advantageous embodiment. As can be seen in this example, emergency equipment package 800 may include bag 802, sleeve 804, and pull cord 806. Emergency equipment package 800 also may include the emergency equipment. This emergency equipment may be, for example and without limitation, a life vest, a flotation device, a flashlight, or some other suitable equipment.

In this example, bag 802 may be a sealable bag and may be air evacuated. Bag 802 may be constructed from materials, such as, for example and without limitation, polyethylene, polyvinyl chloride, nylon, neoprene, polypropylene, and other suitable materials. Further, bag 802 may be made from materials allowing for bag 802 to be air evacuated and/or sealed. Also, bag 802 the selected materials may be durable and water resistant. For example, without limitation, a fiber embedded nylon treated for water resistance may be used.

As illustrated, sleeve 804 may be secured or attached to bag 802. Sleeve 804 may be made from the same material or from a different material as bag 802. Further, sleeve 804 when secured or attached to bag 802 may be replaceable. In other advantageous embodiments, sleeve 804 may be formed integrally as part of bag 802. Sleeve 804 allows ripper bar 700 in FIG. 7 to receive sleeve 804 from angled end 706 in FIG. 7.

Figure 9:
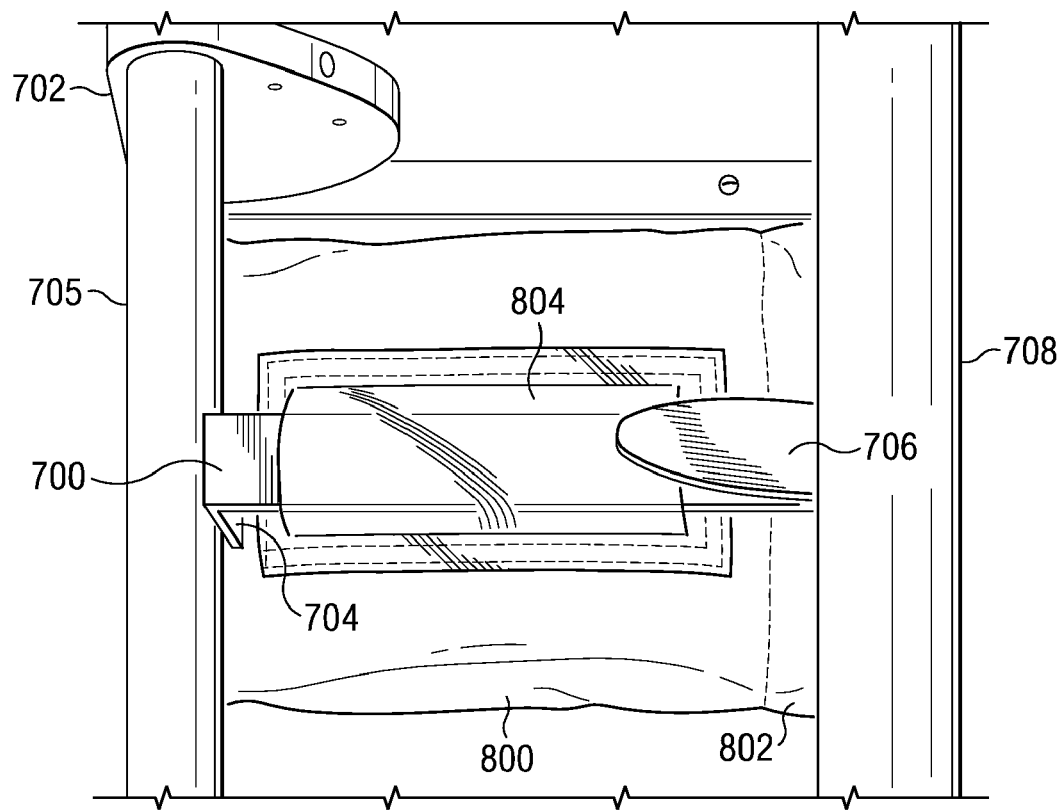
FIG. 9 is an illustration of an emergency equipment system in accordance with an advantageous embodiment.

With reference now to FIG. 9, an illustration of an emergency equipment system is depicted in accordance with an advantageous embodiment. As can be seen in this illustration, emergency equipment package 800 may be secured to ripper bar 700. Sleeve 804 may move over angled end 706 to be secured onto ripper bar 700. Angled end 706 may prevent sleeve 804 from being moved off of ripper bar 700. Equipment package 800 may be removed from ripper bar 700 without cutting the sleeve 804 with special training and/or tools for maintenance purposes. Additionally, a cutter (shown in FIG. 10) may cut sleeve 804 when emergency equipment package 800 may be moved forward towards angled end 706 and front 708.

Figure 10:
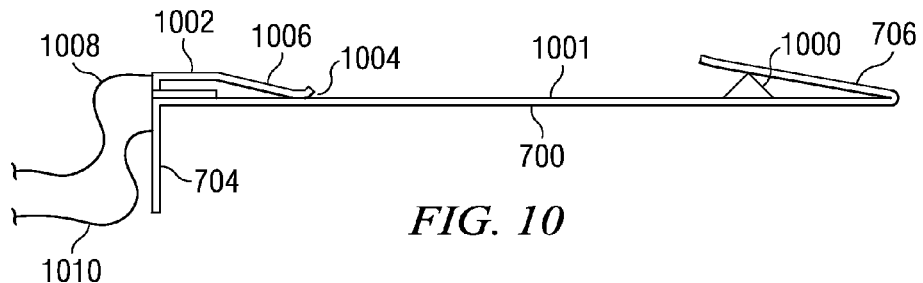
FIG. 10 is an illustration of a side view of a ripper bar in an emergency equipment system in accordance with an advantageous embodiment.

Turning now to FIG. 10, an illustration of a side view of a ripper bar in an emergency equipment system is depicted in accordance with an advantageous embodiment. As can be seen in this example, cutter 1000 may be located on surface 1001 within angled end 706 of ripper bar 700.

In these examples, cutter 1000 is positioned in a manner to protect against injuring a person and/or emergency equipment package 800. This illustration also depicts sensor 1002. Sensor 1002 includes conductive leads 1008 and 1010, which may be connected to a sensor system. Sensor 1002 may be formed from clip 1006, ripper bar 704, conductive lead 1008, and conductive lead 1010. As illustrated, conductive lead 1008 may be connected to clip 1006 and conductive lead 1010 may be connected to ripper bar 700. Clip 1006 may be secured to ripper bar 704. Clip 1006 may contact ripper bar 704 at point 1004 to generate a closed circuit.

Figure 11:
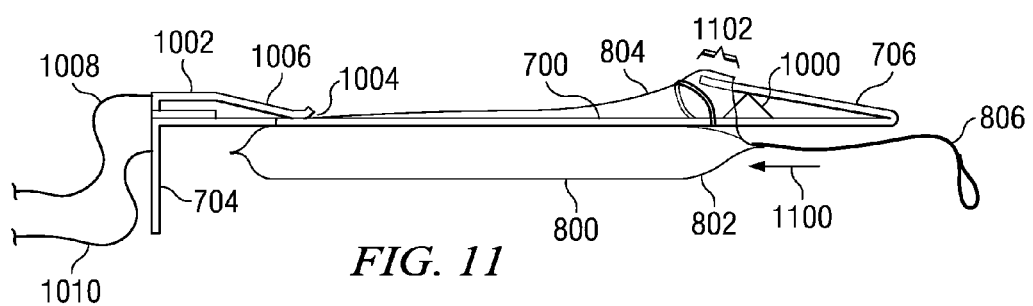
FIG. 11 is an illustration of a side view of an emergency equipment system in accordance with an advantageous embodiment.

With reference now to FIG. 11, an illustration of a side view of an emergency equipment system is depicted in accordance with an advantageous embodiment. FIG. 11 may illustrate a nearly installed emergency equipment package.

In this example, emergency equipment package 800 may be slid in direction 1100. As can be seen, sleeve 804 may be slid over angled end 706 to be secured onto ripper bar 700. In this example, sleeve 804 has not yet slid all the way off of angled end 706. A portion of sleeve 804 still covers section 1102 of angled end 706. In this example, clip 1006 in sensor 1002 may no longer contact ripper bar 700 at point 1004. Instead, sleeve 804 may be located between clip 1006 and ripper bar 700.

In these examples, ripper bar 700 may be made of a conductive material, and sensor 1002 may be a switch that closes a circuit when sensor 1002 contacts ripper bar 700 at point 1004. In these examples, sleeve 804 may be made from a non-conductive material such that an open circuit state may occur with sleeve 804 located between clip 1006 and ripper bar 700 at point 1004. Once emergency equipment package 800 becomes secured on ripper bar 700, emergency equipment package 800 is in a state that does not allow reinstallation of the package once the package becomes partially or fully removed from ripper bar 700.

Figure 12:
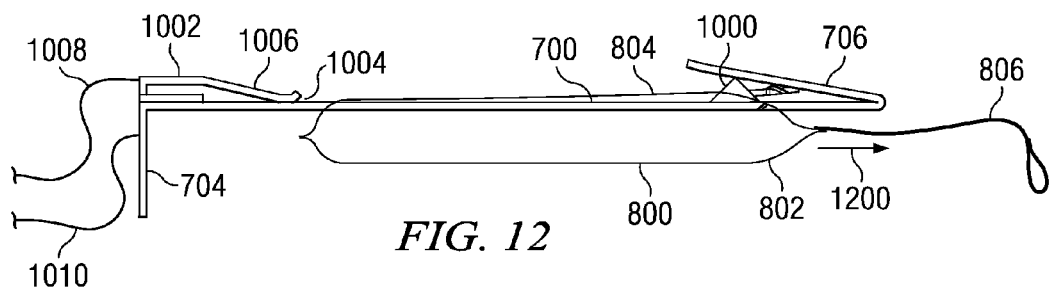
FIG. 12 is an illustration of a partially removed emergency equipment package in accordance with an advantageous embodiment.

With reference now to FIG. 12, an illustration of a partially removed emergency equipment package is depicted in accordance with an advantageous embodiment. In this illustration, emergency equipment package 800 may have been moved along the direction of arrow 1200. As can be seen in this example, sleeve 804 may have been partially cut by cutter 1000. Further, sleeve 804 may no longer be located between sensor 1002 and ripper bar 700 at point 1004. At this point, a closed circuit may be present and an indication alert may be generated to the sensor system through a signal sent through conductive leads 1008 and 1010.

With this integrated sensing system, no inspections may be required if life vests have been not recorded as removed. Further, this type of system allows for easy installation of emergency equipment package 800 by maintenance crews. When sleeve 804 becomes ripped, another sleeve may be attached or secured to emergency package 800.

Additionally, when sleeve 804 is formed integrally as part of emergency equipment package 800, this package may be designed such that the emergency equipment may be easily placed into another intact emergency equipment package. Thus, in these examples, the design of sleeve 804 and emergency equipment package 800 in combination with ripper bar 700 may provide a system that allows the maintenance crew to quickly replace and/or install emergency equipment in a secure fashion. Further, this type of system may remove the need for a separate life vest pouch located under the seat. In this manner, an additional space allowing for placement of unwanted and/or undesired objects may be eliminated.

Figure 13:
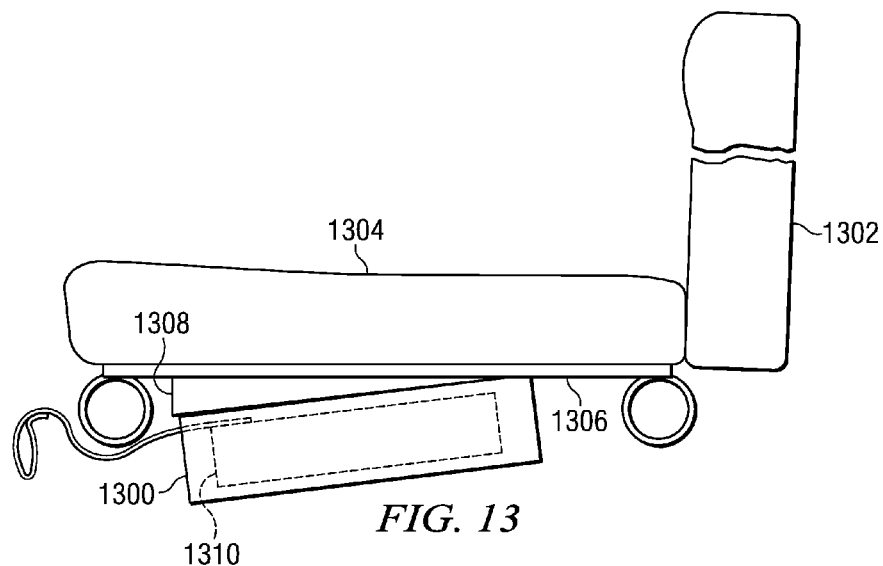
FIG. 13 is an illustration of an emergency equipment system installed in an aircraft seat in accordance with an advantageous embodiment.

With reference now to FIG. 13, an illustration of an emergency equipment system installed in an aircraft seat is depicted in accordance with an advantageous embodiment. FIG. 13 is an example of one implementation of emergency equipment system 600 in FIG. 6. In this example, housing 1300 may be installed under aircraft seat 1302. In particular, housing 1300 may be installed under seat cushion 1304 and attached to seat pan 1306. In this example, housing 1300 may be positioned at an angle using mounting wedge 1308 to allow easier access to emergency equipment package 1310 located within housing 1300.

Figure 14:
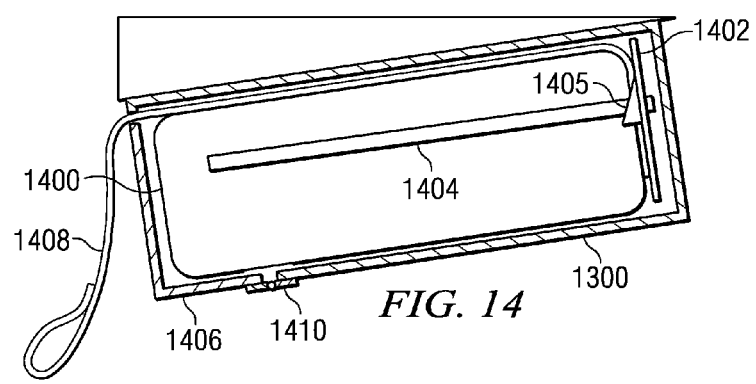
FIGS. 14 and 15 are a more detailed illustration of components in an emergency equipment system in accordance with an advantageous embodiment.

With reference now to FIG. 14, a more detailed illustration of components in an emergency equipment system is depicted in accordance with an advantageous embodiment. As depicted, interior wall 1402 may be located behind emergency equipment 1400 inside housing 1300. In this illustration, interior wall 1402 may be moveably attached to bar 1404, which may be located on one or both sides of housing 1300 to prevent obstructing emergency equipment 1400. Interior wall 1402 may slide forward or backward along bar 1404. In these advantageous embodiments, locking mechanism 1405 may be included to prevent interior wall 1402 from sliding backwards when emergency equipment 1400 moves from housing 1300. In this illustration, door 1406 may be in a closed position.

Pull cord 1408 may allow a person access to emergency equipment 1400 when needed. Pulling pull cord 1408 may open door 1406 and move emergency equipment 1400 out of housing 1300. In this example, pull cord 1408 may be connected to interior wall 1402. Pull cord 1408 may be used to move interior wall 1402 forward along with emergency equipment 1400. Sensor 1410 may be used to detect when door 1406 has been opened. As a result, sensor 1410 may be used to indicate when housing 1300 may have been opened and/or accessed. In this manner, an inspection may only need to be made of housing 1300 and not other housings containing emergency equipment under other aircraft seats.

Figure 15:
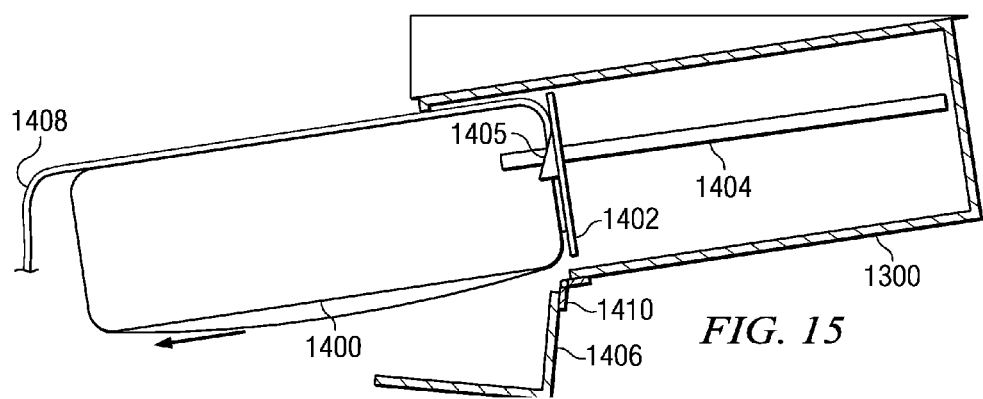

With reference now to FIG. 15, emergency equipment 1400 has been pulled outwards from housing 1300. Door 1406 is open and interior wall 1402 has moved forward on bar 1404. In these advantageous embodiments, interior wall 1402 cannot be moved backwards to allow emergency equipment 1400 to be placed back into housing 1300 without a key (not shown) for locking mechanism 1405.

Figure 16:
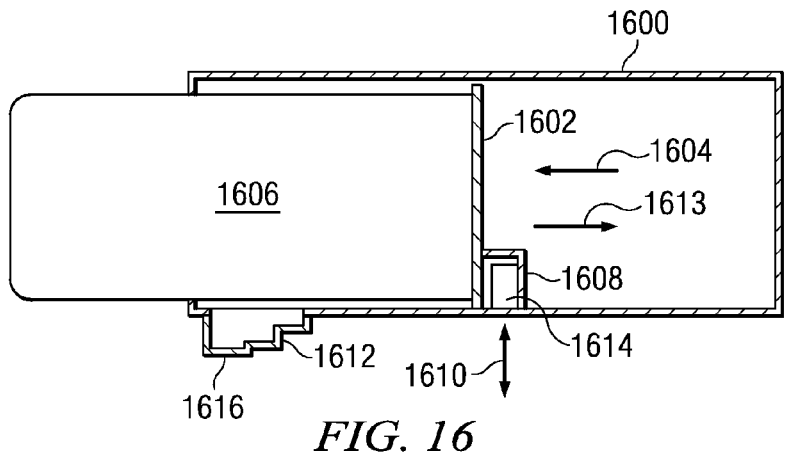
FIG. 16 is an illustration of a side cross sectional view of an emergency equipment system in accordance with an advantageous embodiment.

With reference now to FIG. 16, an illustration of a side cross sectional view of an emergency equipment system is depicted in accordance with an advantageous embodiment. In this example, housing 1600 may include interior wall 1602. Interior wall 1602 may slide forward in the direction of arrow 1604 in this example.

Interior wall 1602 slides forward as emergency equipment 1606 moves in the direction of arrow 1604. In these examples, cylinder unit 1608 and recess 1612 may form a locking mechanism, which may prevent interior wall 1602 from moving in the direction of arrow 1610. Cylinder unit 1608 may be attached to interior wall 1602. Cylinder unit 1608 may include moveable cylinder 1614, which may be moveable along the directions of arrow 1610. Cylinder unit 1608 may be, for example, without limitation, a metal cylinder, a magnet, or some other suitable material.

Recess 1612 also may be present in housing 1600. Recess 1612 may be positioned within housing 1600 to receive cylinder unit 1608. In this example, recess 1612 may have steps 1616 to allow cylinder unit 1608 to progressively be received into recess 1612. In this manner, movement of interior wall 1602 in the direction of arrow 1613 may be prevented after interior wall 1602 has traveled some distance in the direction of arrow 1604. Although recess 1612 is illustrated as only extending along a small portion of housing 1600, recess 1612 may be implemented using different lengths. For example, additional steps may be included in steps 1616 such that recess 1612 extends along additional portions of housing 1602. In this manner, additional incremental limiting of movement in the direction of arrow 1613 may be provided.

Figure 17:
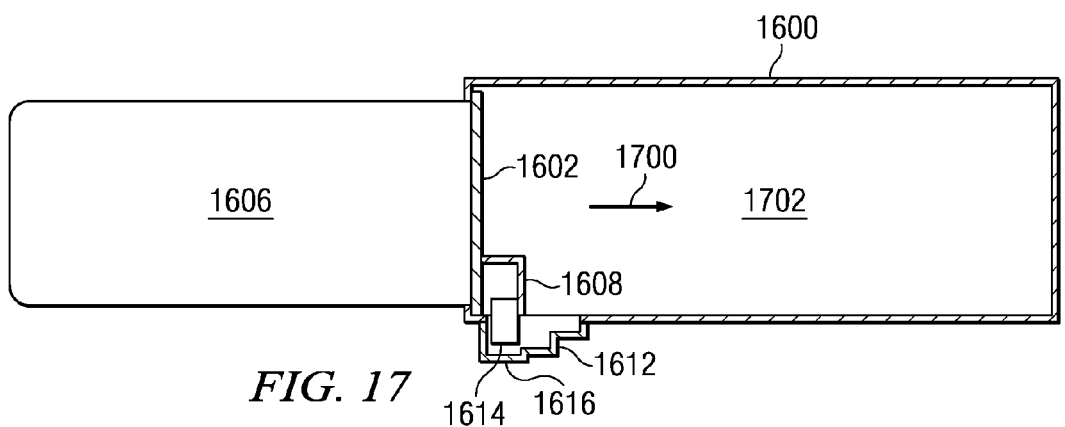
FIGS. 17 and 18 are illustrations of an emergency equipment system in accordance with an advantageous embodiment.
Figure 18:
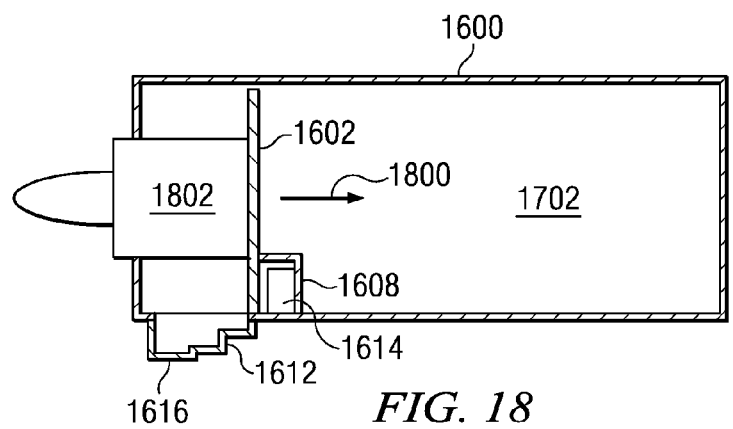

Turning now to FIGS. 17 and 18, illustrations of an emergency equipment system are depicted in accordance with an advantageous embodiment. In this example, in FIG. 17, emergency equipment 1606 has been moved out of housing 1600 in a manner that cylinder unit 1608 has been engaged in recess 1612. At this point, interior wall 1602 cannot be moved in direction 1700 without a key, shown in FIG. 18 below. Interior wall 1602 blocks interior 1702 of housing 1600 from being accessed. In this manner, emergency equipment 1606, or some other object, may not be placed into housing 1600 until cylinder unit 1608 has been disengaged from recess 1612.

In FIG. 18, cylinder unit 1608 may be disengaged from recess 1612 to allow interior wall 1602 to be moved in the direction of arrow 1800. Cylinder unit 1608 may be disengaged from recess 1612 using key 1802. In this example, key 1802 may be a magnet (not shown).

Although specific examples of locking mechanisms have been depicted in these figures, the illustrations are not meant to limit the manner in which different locking mechanisms may be used to secure an interior wall in a housing. Other locking mechanisms, such as, for example, a one way slip nut on a bolt, a ratchet on a bar with teeth, and other suitable mechanisms may be used to prevent movement of an interior wall in two directions without a key.

Figure 19:
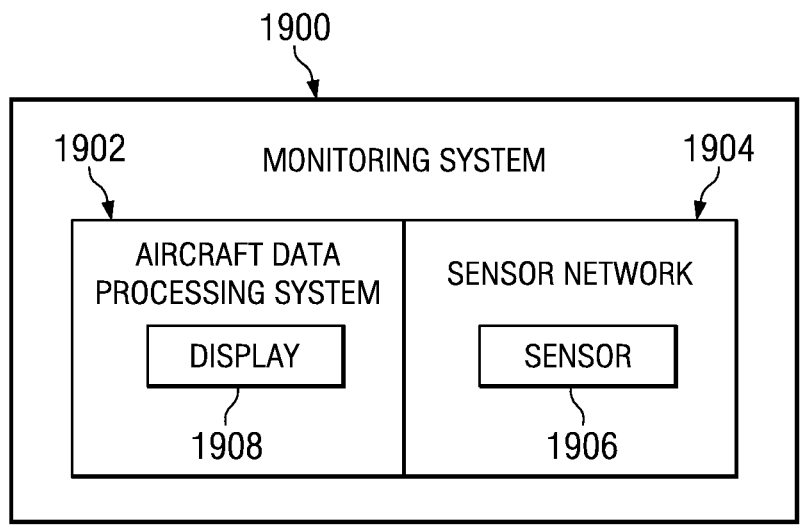
FIG. 19 is an illustration of a block diagram of a monitoring system is depicted in accordance with an advantageous embodiment.

With reference now to FIG. 19, an illustration of a block diagram of a monitoring system is depicted in accordance with an advantageous embodiment. In this example, monitoring system 600 may be an example of a monitoring system that may be found in an aircraft, such as aircraft 200 in FIG. 2. Monitoring system 1900 is an example of monitoring system 216 within systems 204 in FIG. 2.

Monitoring system 1900 in these examples may include aircraft data processing system 1902 and sensor network 1904. Aircraft data processing system 602 may be, for example, a computer, a line replaceable unit, or some other suitable component capable of performing operations to monitor sensors. Aircraft data processing system 6102 monitors sensor network 1904 for signals or messages that may indicate a presence of unauthorized access to an area in the aircraft.

Sensor network 1904 may contain different types of sensors to monitor various states within the aircraft. Sensor network 1904 may include, for example, without limitation, a temperature sensor, a biometric unit, an air flow detector, a switch, and/or some other suitable sensor device. Sensor 1906 may be part of sensor network 9104.

In these examples, sensor network 1904 may detect a state of sensor 1906. Sensor 1906 in this advantageous embodiment may be, for example, sensor 508 in FIG. 5 or sensor 616 in FIG. 6.

Figure 20:
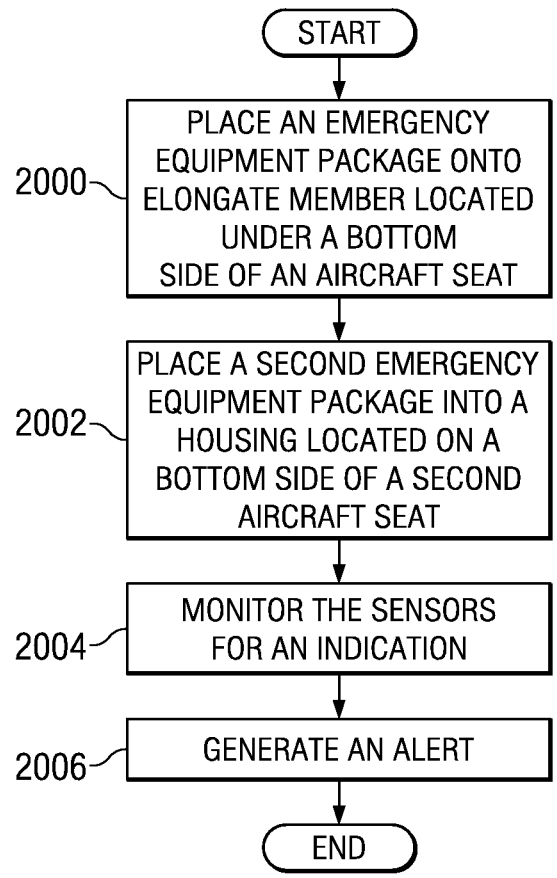
FIG. 20 is a flowchart of a process for monitoring aircraft emergency equipment in an aircraft in accordance with an advantageous embodiment.

Turning to FIG. 20, a flowchart of a process for monitoring aircraft emergency equipment in an aircraft is depicted in accordance with an advantageous embodiment. The process illustrated in FIG. 20 may be implemented using a monitoring system, such as monitoring system 1900 in FIG. 19.

The process begins by placing an emergency equipment package onto an elongate member located under a bottom side of an aircraft seat (operation 2000). The elongate member has a first end and an angled end, wherein the elongate member is located on a bottom side of an aircraft seat. The emergency equipment package has a sleeve on one side capable of receiving the elongate member from the angled end in which a cutter attached to a side of the elongate member is capable of cutting the sleeve.

A conductive sensor is attached to around one end of the ripper bar. The conductive sensor is in an open state while the sleeve is secured to the ripper bar preventing the conductive sensor from contacting the elongate member. The conductive sensor is in a closed state and when the emergency equipment package is moved towards the second end a selected distance and the conductive sensor contacts the elongate member, the sensor generates an indication.

A second emergency equipment package may be placed into a housing located on a bottom side of a second aircraft seat (operation 2002). The housing has an opening, a moveable door attached to the opening, an interior wall capable of being moved into a location towards the opening when a piece of emergency equipment located within the housing is moved in a first direction, and a locking mechanism capable of locking the interior wall in the location. The housing also has a sensor capable of detecting movement of the moveable door, wherein this sensor generates an indication when the moveable door has been opened.

The process then monitors the sensors for an indication (operation 2004). In response to detecting the indication, the process generates an alert (operation 2006) with the process terminating thereafter.

In this manner, this advantageous embodiment may provide an ability to detect when emergency equipment may have been tampered with and/or removed from a housing. Further, the different advantageous embodiments also may prevent replacement of emergency equipment once the emergency equipment has been removed from the housing. The different advantageous embodiments may provide a moveable partition that locks and/or moves only in a direction towards the opening of the housing. In this manner, as an emergency equipment package is removed, the amount of volume and/or space within the housing may be reduced to prevent replacement of the emergency equipment package. Further, this moveable partition also may prevent other objects from being placed into the housing after removal of an emergency equipment package.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments, in the illustrative examples, are describe with respect to an aircraft, one or more the different advantageous embodiments may be applied to other vehicles other than aircraft, such as, for example, without limitation, a bus, a passenger ship, a spacecraft, a submarine, a train, and other suitable vehicles.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An emergency equipment system comprising:
an elongate member having a first end, an angled end, and a cutter attached to the elongate member such that the cutter is disposed at least partially within a space between a first portion of the elongate member extending from the angled end and a second portion of the elongate member extending from the angled end; and
an emergency equipment package having a sleeve on one side, wherein the sleeve receives the elongate member from the angled end, and wherein the angled end is configured to retain the sleeve on the elongate member in a position such that removal of the emergency equipment package from the elongate member causes the cutter to cut the sleeve.

2. The emergency equipment system of claim 1, wherein the cutter is located on the elongate member such that moving the emergency equipment package secured on the elongate member a selected distance towards the angled end causes the cutter to cut the sleeve.

3. The emergency equipment system of claim 1, wherein the sleeve has an opening and is further configured such that if the opening in the sleeve is moved around a first edge of the second portion of the elongate member, the cutter will not cut the sleeve.

4. The emergency equipment system of claim 1 further comprising:
an aircraft seat frame, wherein the elongate member has a second end opposite the angled end and the second end is connected to the aircraft seat frame.

5. The emergency equipment system of claim 1, wherein the emergency equipment package is selected from one of a life vest, a smokehood, a fire extinguisher, a portable oxygen unit, a defibrillator, and a megaphone.

6. The emergency equipment system of claim 1, wherein the emergency equipment package is air evacuated and sealed.

7. The emergency equipment system of claim 6, wherein the sleeve is further configured such that when the cutter cuts the sleeve on the one side of the emergency equipment package, an air tight seal is breached.

8. The emergency equipment system of claim 1 further comprising:
a pull chord attached to the emergency equipment package.

9. The emergency equipment system of claim 1, wherein the elongate member is a ripper bar.

10. The emergency equipment system of claim 1, wherein the sleeve is a non-conductive sleeve and the elongate member is conductive and further comprising:

a conductive sensor attached to the first end of the elongate member wherein the conductive sensor is configured to be in an open state while the sleeve is secured to the elongate member, thereby preventing the conductive sensor from contacting the elongate member, and wherein the conductive sensor is configured to be in a closed state when the conductive sensor contacts the elongate member when at least a portion of the sleeve is unsecured from the elongate member, and wherein the conductive sensor is further configured to generate an indication when the conductive sensor is in the closed state.

* * * * *